United States Patent
Pouchak et al.

(10) Patent No.: US 6,904,874 B1
(45) Date of Patent: Jun. 14, 2005

(54) FORWARD CALCULATION ENERGY AUGMENTATION METHOD

(75) Inventors: Michael A. Pouchak, Saint Anthony, MN (US); Jeffrey M. Hammer, Maple Plain, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/809,116

(22) Filed: Mar. 25, 2004

(51) Int. Cl.⁷ .............................................. F22B 37/47
(52) U.S. Cl. ..................... 122/448.2; 122/447
(58) Field of Search ........................ 122/448.2, 448.1, 122/447; 219/483, 490, 509, 510

(56) References Cited

U.S. PATENT DOCUMENTS

| | | |
|---|---|---|
| 4,373,663 A | 2/1983 | Hammer |
| 4,598,669 A * | 7/1986 | Funk ........................ 122/448.1 |
| 5,154,162 A | 10/1992 | Chang |
| 5,400,962 A * | 3/1995 | Adams et al. ............ 236/20 R |
| 5,960,558 A | 10/1999 | Bourgault |
| 6,055,944 A | 5/2000 | Santiago |
| 6,390,027 B1 | 5/2002 | Lyons et al. |
| 6,401,669 B1 | 6/2002 | Macgowan et al. |
| 6,536,678 B2 | 3/2003 | Pouchak |
| 6,540,148 B1 | 4/2003 | Salsbury et al. |
| 6,694,927 B1 | 2/2004 | Pouchak et al. |
| 2002/0193890 A1 | 12/2002 | Pouchak |

OTHER PUBLICATIONS

ES Engineered Systems, "Features Item: A New Look At Modular Boiler Systems," 10 pages, Mar. 2001.
Lochinvar, "Intelli–Fin Gas Fired Boilers," 6 pages, Apr. 2003.
Lochinvar, "Intelli–Fin Sequencing Options Mean New Levels of Building Efficiency," 2 pages, Nov. 2002.
Slant Fin Terra Therma, Typical Applications, 15 pages, Feb. 2002.
Triad Boiler Systems Inc., "Modular Steel Firetube Packaged Boiler Systems," 3 pages, Mar. 12, 2004.

* cited by examiner

*Primary Examiner*—Gregory A. Wilson

(57) ABSTRACT

Devices and methods for controlling a boiler system. One illustrative method includes controlling the bypass temperature by increasing the firing rate of the boiler. Further methods include bypass temperature control methods wherein both regular and fast control methods are used, where the regular method operates to control bypass temperature by using, first, a bypass valve, and second, possible increases in firing rate. The fast control method responds to particular situations suggesting potential condensation in a primary heat exchanger to increase firing rate without waiting for a bypass valve to fully open. Further embodiments include controllers programmed for or containing programming for performing steps of the method embodiments, as well as systems incorporating such controllers.

27 Claims, 3 Drawing Sheets

FORWARD CALCULATION ENERGY AUGMENTATION METHOD

FIELD

The present invention is related to the field of hot water boilers, and more particularly, to control systems for high efficiency condensing hot water boilers or water heaters.

BACKGROUND

Recent advances in boiler technology have yielded high efficiency condensing boilers. A high efficiency condensing boiler has a primary heat exchanger and a secondary heat exchanger. Circulating fluid (such as return water) going through a high efficiency condensing boiler typically passes through the secondary heat exchanger and then enters the primary heat exchanger. The primary heat exchanger receives heat from burning fuel, while the secondary heat exchanger receives exhaust fumes from the primary heat exchanger for heat exchange with the circulating fluid. A temperature sensor sensed the circulating fluid entering the secondary heat exchanger and may be referred to as an "inlet" or "return" fluid temperature sensor. Circulating fluid entering the primary heat exchanger is monitored by another temperature sensor that is referred to as a "bypass" temperature sensor.

In many high efficiency condensing boilers, condensation in the primary heat exchanger can cause damage to the internal components of the primary heat exchanger. In such boilers, condensation should be minimized or prevented in the primary heat exchanger. Condensation is typically allowed to occur in the secondary heat exchanger, as the secondary heat exchanger is often constructed to withstand such condensation. In many cases, and to help minimize or prevent condensation from occurring in the primary heat exchanger, it is often desirable to keep the bypass water temperature above some minimum temperature.

The secondary heat exchanger typically causes, at most, about a ten degree rise in temperature of the returning fluid passing there through. To help keep the bypass temperature above the desired level, some high efficiency condensing boilers provide a bypass system that often includes a bypass valve that can be opened or closed, as needed, to maintain the bypass temperature at the boiler input by routing fluid leaving the primary heat exchanger back to the inlet to the primary heat exchanger.

Some applications include using a high efficiency condensing boiler to heat water that is supplied to circulation pipes under a sidewalk or driveway in cold climates (for example, to remove or prevent ice buildup). In such applications, hot water is supplied to the circulation pipes by the boiler, but a significant amount of heat is removed from the water before the water is returned to the boiler. As such, the water temperature at the inlet of the primary heat exchanger can be quite low, making it more difficult to maintain the bypass water temperature above the minimum temperature value in a robust and efficient manner.

SUMMARY

The present invention, in a first embodiment, provides methods of controlling a boiler system. One illustrative method includes controlling the bypass temperature by increasing the firing rate of the boiler. Further methods include bypass temperature control methods wherein both regular and fast control methods are used, where the regular method operates to control bypass temperature by using, first, a bypass valve, and second, possible increases in firing rate. The fast control method responds to particular situations indicating potential condensation in a primary heat exchanger to increase firing rate without waiting for a bypass valve to fully open. Further embodiments include controllers programmed or containing programming for performing steps of the method embodiments.

DETAILED DESCRIPTION

Figure 1:
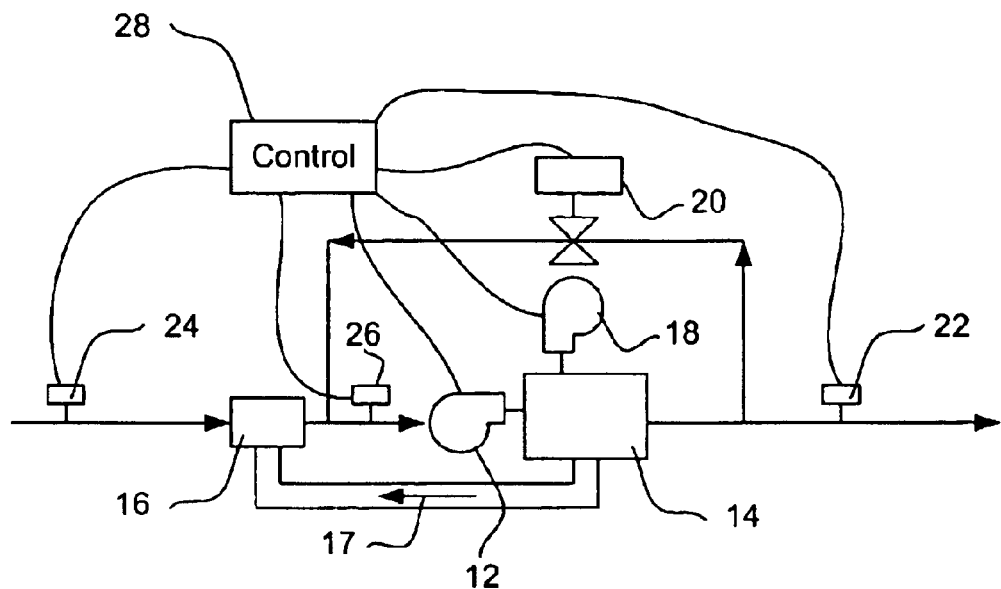
FIG. 1 is a schematic illustration of a high efficiency condensing boiler system.

The following detailed description should be read with reference to the drawings. The drawings, which are not necessarily to scale, depict illustrative embodiments and are not intended to limit the scope of the invention.

While much of the following detailed description focuses on an embodiment having one boiler, it should be understood that for multi-boiler systems, there are several manners for incorporating the present invention. If multiple boilers are used in parallel, then each boiler in the system may separately include a controller adapted to perform the methods which follow. Further, with multiple boilers, a single controller may adapt the following methods to enable a single boiler to have an increased firing rate for preventing condensation in other boilers, if so desired. If several boilers are used in series, then the following methods focus primarily on the goal of protecting the first boiler to receive returning water, as later boilers in the series should receive water at higher temperatures due to the work done by the first boiler in the series. As used herein, a heat exchanger intake indicates the portion of a heat exchanger for receiving a circulating fluid in order to heat the circulating fluid.

While the following detailed description discusses, primarily, water as the circulating fluid, any suitable fluid may be used for these methods, and if water is the circulating fluid, any desired or suitable additives may be used as well.

A boiler itself operates having certain inherent characteristics and may be roughly modeled as a second order responsive system. For example, the boiler receives a signal for more heat and there is a delay before added heat is provided, and alternately, when sufficient heat has been provided there is a delay before the boiler stops producing such added heat. Most proposed solution methods are or are similar to proportional/integral control methods; which are second order methods having three solutions: overdamped, underdamped, and critically damped. Designs are usually formulated for underdamped responses having sufficient damping to attenuate overshoot relatively quickly.

A problem recognized here is that the typically desired proportional/integral response, while illustrating an underdamped response, still attenuates quickly, since wide heating swings over time are undesirable. However, given a large input perturbation, the ordinarily desired damping can prevent adequate response to prevent condensation damage in the primary heat exchanger. Therefore, in the following illustrative embodiments of the present invention, a second, faster (less damped) response method is applied in parallel with a first response method, where the second response method provides a response only under certain conditions where it has been identified that there is a potential for damage if an input perturbation occurs. Some of the following embodiments use a second variable in place of that ordinarily used in the boiler control method by referring to the inlet temperature rather than the bypass temperature.

In several embodiments, the second formula, when brought into use, controls the boiler firing rate. In one such embodiment, the first formula is used to control the bypass valve, partly because faster control of the bypass valve is limited by the bypass valve itself. For example, the bypass valve may be relatively slow to respond, taking several minutes to move from fully closed to fully open. Modifying the firing rate, in contrast, can create a more dramatic increase in bypass temperature more quickly. In the illustrative example, the second formula does not wait for modification of the bypass valve position, instead going to a change in firing rate in response to an identified set of circumstances which the first method may not be capable of resolving adequately. For systems such as those illustrated in U.S. Pat. No. 6,694,927 to Pouchak et al., which is incorporated herein by reference, the relatively slow changes in bypass temperature effected by modification of the bypass valve position operate as a damping mechanism, slowing response and limiting overshoot.

The following illustrative examples show "fast" responses using firing rate modifications. One reason for focusing on the firing rate rather than the bypass valve for the fast response is that the effect that raising the firing rate has on bypass temperature is more dramatic than the effect that can be had by opening the bypass valve further. In some systems, a small change of firing rate can have a greater effect on the bypass temperature than a complete change from full closed to full open of the bypass valve.

FIG. 1 is a schematic illustration of a high efficiency condensing boiler. The system includes a pump 12 moving water through a primary heat exchanger 14. Flue gasses 17 from the primary heat exchanger 14 are directed to a secondary heat exchanger 16 placed in the return water path for the system. Firing rate and flue gas flows are controlled, in part, using a combustion/purge blower 18. The firing rate may also be controlled using various valves for controlling fuel flow, air/fuel mixing devices, and other control mechanisms (not shown). A bypass valve 20 is used to direct output water back to the return flow before it enters the primary heat exchanger 14, as needed. Several 20 sensors 22, 24, 26 relay signals to a controller 28. The controller 28 controls several system components including the pump 12, blower 18, and bypass valve 20, as well as other boiler components such as gas control valves, air/gas mixers, etc.

For the purposes herein, the sensor that is prior to the secondary heat exchanger 16 is referred to as the inlet sensor 24. The sensor that is between the secondary heat exchanger 16 and the primary heat exchanger 14 is the bypass sensor 26. The sensor after the primary heat exchanger 14 is the output sensor 22. If the temperature sensed by the bypass temperature sensor 26 is too low, the bypass water temperature may be low enough to cause condensation in the primary heat exchanger 14. In response to the bypass temperature sensor 26, the bypass valve 20 may open to a greater degree to allow output water to feed back to the return flow and warm the temperature sensed at the bypass sensor 26. If the bypass valve 20 is already fully open, the firing rate of the boiler may be adjusted to increase its heat output.

The combustion/purge blower 18 may be a variable frequency drive unit that can help provide a variable firing rate for the boiler. When the variable frequency drive of the blower 18 operates at a high level, the blower 18 increases the heating output of the boiler, as well as forcing a greater amount of flue gasses 17 to the secondary heat exchanger 16. During operation, the secondary heat exchanger 16 warms inlet water before it enters the primary heat exchanger 14. As flue gasses 17 pass through the secondary heat exchanger 16, condensate can form inside the secondary heat exchanger 16, which is designed and adapted to handle condensation without resulting in excessive corrosion.

Figure 2:
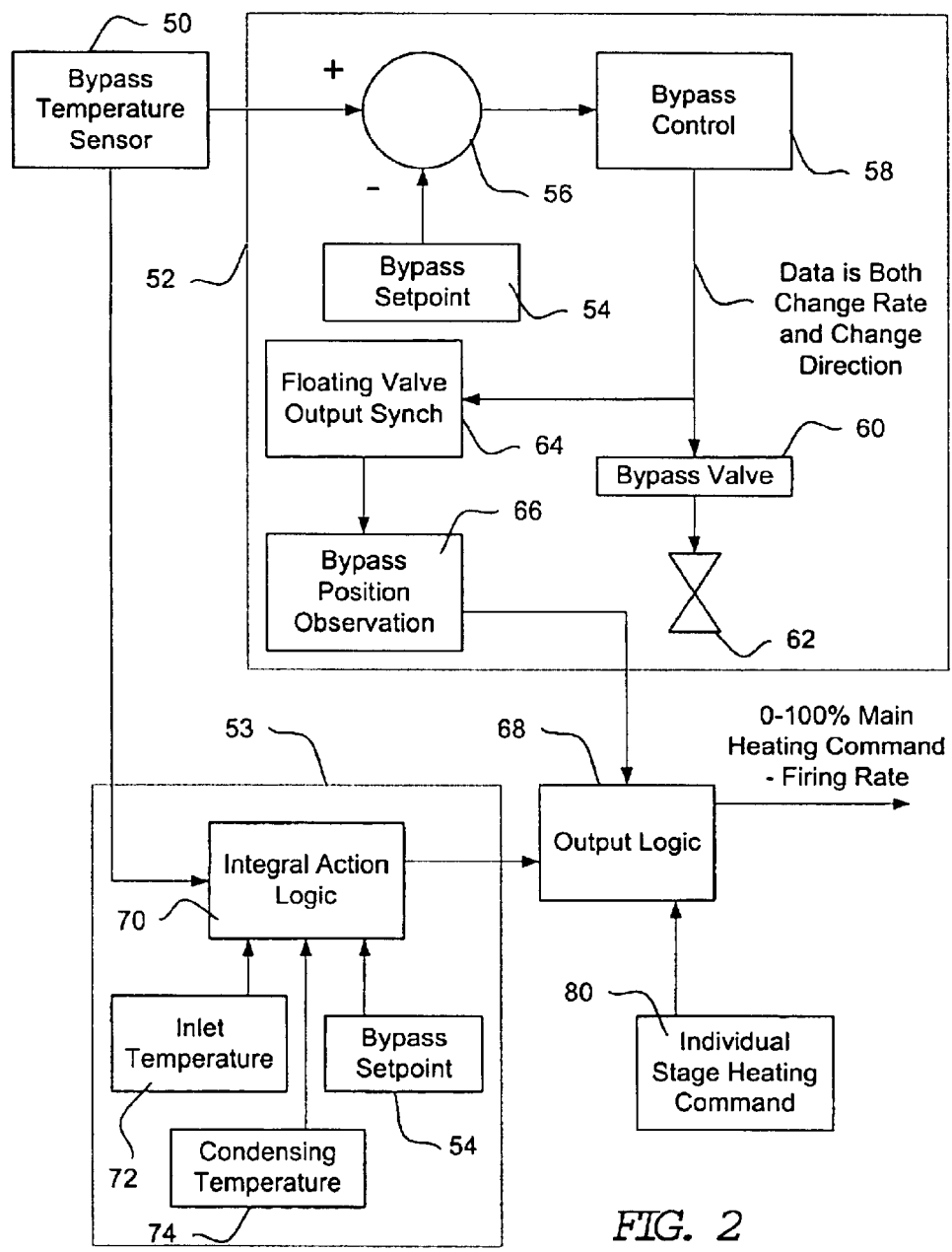
FIG. 2 is a block diagram representing dual modes for bypass control.

FIG. 2 is a block diagram representing dual modes for bypass control. The control begins by observing the output of a bypass temperature sensor 50 and continues with parallel determinations in an regular block 52 and a fast action block 53. The regular block 52 is the one which is used most of the time for bypass control. In the regular block 52, the bypass temperature sensor 50 provides an output that is compared to a bypass setpoint 54, shown as comparison 56.

The comparison 56 yields an error signal that is sent to bypass control 58. The bypass control 58 observes the rate of error change and the actual error and uses an error derivative look-up table to determine whether to call for additional or less bypass warming. This control signal is sent to a bypass valve control 60 that causes the bypass valve 62 to open or close (or remain in position). A floating valve output synch 64 is periodically used to re-synch the bypass valve 62, and can periodically call for the bypass valve 62 to be opened or closed for synchronization purposes.

A bypass position observation block 66 monitors the bypass valve 62 and its movements to provide data related to the extent to which the bypass valve 62 is open. In some systems, the bypass position observation block 66 determines how much the bypass control 58 has requested opening of the bypass valve 62. If the bypass valve 62 reaches a state of 100% open, the bypass position observation block 66 will indicate to output logic 68 that the bypass valve 62 cannot open further, yet bypass control 58 is continuing to call for more bypass warming. In response, the output logic 68, in some systems, can increase the firing rate call it sends to the blower (not shown) and other boiler controls.

The signal to increase firing rate may occur as soon as the 100% valve open level is reached, or may wait for a threshold of some sort, before making such a call. A "threshold" for increased firing rate may take many forms. For example, if the 100% level is exceeded for a certain period of time or by a certain amount, or by a sliding scale accounting for both the period of time and the amount of excess, the "threshold" may be breached. In place of a threshold, some other factor may be considered, for example, if the time elapsed from a 90% level to reaching the 100% level is below a certain amount. As noted above, increasing firing rate can affect the bypass temperature in a more dramatic fashion than adjusting the bypass valve 62.

However, changing firing rate results in reduced system efficiency, since the system operates at a higher level than needed for the purposes of heating and may cycle more frequently. Further, the higher firing rate can cause an increase in the variance of output temperatures and system temperatures around a setpoint, where such variation may be exaggerated beyond what it would otherwise be. Therefore, for situations that are determined to be relatively safe, adjustments to the bypass valve 62 may be performed first, and if those adjustments fail to keep the bypass temperature up, then the firing rate may be adjusted.

The fast block 53 may provide another signal in response to changing or potentially damage-causing situations. For example, as the bypass control 58 calls for additional bypass warming of return water, it will first call for opening of the bypass valve 62 until it reaches 100% open, after which the bypass position observation 66 will pass along a signal to the output logic 68 calling for (or causing the output logic 68 to determine it is necessary to call for) increased firing rate. The example fast block 53 can call for increased firing rate earlier because it does not wait for a determination that the bypass valve 62 cannot open further.

The following is an illustrative example of how one may perform the steps within the fast block 53 to determine if a higher firing rate should be requested. An integral action logic block 70 takes several pieces of data. First, the output of the bypass temperature sensor 50 is observed, as well as the inlet temperature 72 taken from an inlet temperature sensor (not shown). Two constants, the condensing temperature 74 and the bypass setpoint 54, are also observed. Preferably the bypass setpoint 54 is set higher than the condensing temperature 74.

The pseudocode for the illustrative example method goes as follows (noting that the temperatures are in degrees Celsius):

IF [(Bypass_Temp < Bypass_Setpt + 5) AND (K1_Term != 0)]

THEN:
$$\begin{bmatrix} \text{CWD\_Term\_1} = \frac{(T_{CONDENSE} - T_{INLET}) * \text{K1\_Term}}{\text{K3\_Term}}; \\ \text{if (CWD\_Term\_1} < 0\text{, then (CWD\_Term\_1} = 0); \\ \text{CWD\_Term\_2} = \frac{\text{Bypass\_Setpt} - \text{K4\_Term} - \text{Bypass\_Temp}}{\text{K2\_Term}}; \\ \text{CWD\_Int\_Act} = \lim(-30,100, \text{CWD\_Int\_Act} + \text{CWD\_Term\_2}); \\ \text{CWD\_Total\_PID} = \lim(0,100, \text{CWD\_Term\_1} + \text{CWD\_Int\_Act}; \end{bmatrix}$$

ELSE: $\begin{bmatrix} \text{CWD\_Int\_Act} = 0; \\ \text{CWD\_Total\_PID} = 0 \end{bmatrix}$ The acronym CWD indicates a cold water derivative, as in a factor derived from cold water characteristics for the purposes of aiding in the illustrative method. The pseudocode terms are defined as:

Bypass_Temp: Temperature measured at the bypass temperature sensor, where bypass water has mixed with return water and after the secondary heat exchanger but before the primary heat exchanger.

Bypass_Setpt: Desired temperature for the bypass temperature. Typically about 54 degrees Celsius (130 degrees Fahrenheit).

K1_Term: A constant term used for the fast acting control. In the illustrative example, K1_Term=4.

CWD_Term_1: An error indicator determined directly from the inlet temperature. Also referred to as the proportional inlet error.

$T_{CONDENSE}$: Reference temperature below which condensation is assured to occur inside the primary heat exchanger; minimum temperature for water entering the primary heat exchanger; minimum desired bypass temperature. Typically set to about 44 degrees Celsius (111 degrees Fahrenheit). Condensation often begins to occur at higher temperatures than this, however, the low temperature selected would assure condensation and may prevent over-use of the firing rate increase.

$T_{INLET}$: Measured temperature in the circulation flow before the secondary heat exchanger is encountered.

Note that before the fluid enters the primary heat exchanger it will be warmed by both the secondary heat exchanger and, usually, at least some mixing with water fed back through the bypass valve.

K2_Term: Another constant term used for the fast acting control. In the illustrative example, K2_Term=0.8.

CWD_Term_2: A current error term derived from the present bypass temperature and used in the integral term.

CWD_Int_Act: An integral (summing) error term derived from CWD_Term_2. May be called the integral bypass error.

CWD_Total_PID: The composite error term determined from the proportional inlet error and integral bypass error.

K3_Term: A scaling factor, for the illustrative example K3_Term is about 8.

K4_Term: A scaling factor, for the illustrative example, K4_Term is about 3, in degrees C.

Returning to the pseudocode, the first IF statement determines whether the bypass temperature is in a range where checking on the fast acting control is even necessary. If the bypass temperature is more than five degrees higher than the bypass setpoint, there is no need to check on the fast acting control because conditions are well within safe bounds.

The part of the IF statement that follows the AND function checks whether the system is enabled; for the illustrative example, a user may change the value of K1_Term to adjust the control method response and/or to disable the system. As shown, if K1_Term is set to zero, then the firing rate bypass system has been disabled by a user. Instead of checking the K1_Term, an alternative embodiment may use a different variable or check to see if the system is enabled, for example, a toggle switch. It should be noted that for the pseudocode, the !=symbol indicates that the two variables on either side of the symbol are not equal.

Assuming the "IF" condition is met and the system is enabled, the method performs several additional steps. A first term, CWD_Term_1 is directly related to the inlet temperature. If the inlet temperature is less than the condensation temperature for the boiler itself, then the CWD_Term_1 immediately reflects this fact. The K1_Term and the divisor (K3_Term) scale CWD_Term_1. These scaling factors may of course be modified for various applications to provide greater or lesser speed. By increasing CWD_Term_1 using either scalind term, one would increase the speed at which the method embodied in the pseudocode responds as well as the extent to which it modifies firing rate, if needed.

As shown, the CWD_Term_1 is set to zero if the calculation of CWD_Term_1 yields a negative result. Next, a CWD_Term_2 is calculated from the bypass temperature setpoint, the bypass temperature, and two scaling factors, the K2_Term and the K4_Term. CWD_Term_2 acts as a present "error" term relating to the bypass temperature, rather than the inlet temperature. The K2_Term, as noted above, is set to be 0.8, meaning that it amplifies the linear error if the bypass temperature gets too far away from the bypass setpoint. The K4_Term, also as noted above, is set to about three degrees Celsius, and may be adjusted to modify the bypass temperature level at which the system begins integrating for the CWD_Int_Act term.

Next, a CWD_Int_Act term is calculated from the CWD_Term_2. The CWD_Int_Act term is an integral action term that integrates the ongoing error noted by the use of CWD_Term_2. As shown, both positive and negative limits are included for CWD_Term_2. This prevents CWD_Term_2 from accumulating a too large negative or positive value that dominates the CWD_Term_1 in later calculations.

Finally, the CWD_Total_PID value is set as shown. Again, high and low limits are given. The value given, within the limits, is the sum of the immediate error taken from the intake temperature (not the bypass) represented by CWD_Term_1 and the integral action error taken from the bypass temperature represented by CWD_Int_Act.

Next, the firing rate control is dealt with as follows:
IF: [CWD_Total_PID>Total_PID_Error];
THEN: [Main_Heat_Command=CWD_Total_PID];
ELSE: [Main_Heat_Command=Total_PID_Error]

The pseudocode uses Total_PID_Error as the total error calculated using a more regular method such as the regular method 52 shown in FIG. 2. The Main_Heat_Command provides a signal to indicate whether the bypass control calls for an increase in firing rate.

The output logic block 68 also receives a signal from individual stage heating command 80, which relays to the output logic block 68 the amount of heat load that the individual stage of heating (i.e. a single boiler being controlled) is being called upon to provide. For a single boiler system, the individual stage heating command 80 may be simply a thermostat call indicating whether heat is needed. A variety of controllers and methods may be used to provide a signal indicative of the heat load required from the individual boiler.

A summary of the above steps can be explained as follows:
1. Observe whether the boiler bypass temperature is in a range where fast response to a change in cold water input may be needed.
2. If so:
   A. Observe the inlet temperature and compare the inlet temperature to a condensation reference temperature, looking for immediate potential problems and generating an error value based on the current inlet temperature; and
   B. Observe the bypass temperature to generate an integral error that accumulates with time when the bypass temperature is more than an allowed amount below the bypass setpoint.
3. Then, combine the current inlet error value and the integral bypass temperature error to create a signal indicating whether the firing rate should be increased.
4. Finally, use the firing rate increase signal from step 3, in combination with an existing heat load signal, to determine the desired firing rate for the system.

Figure 3:
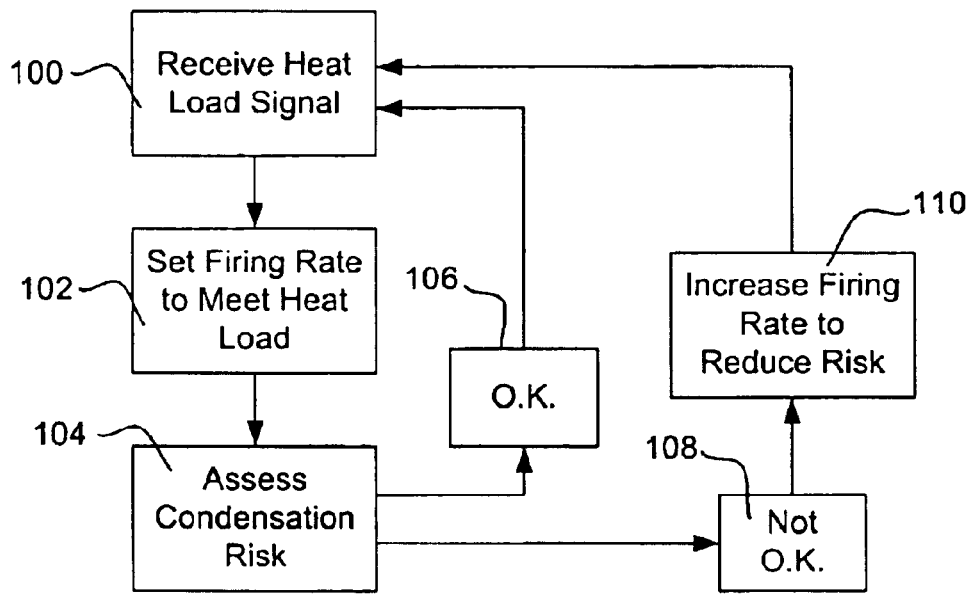
FIG. 3 is a block diagram for an illustrative method.
Figure 4:
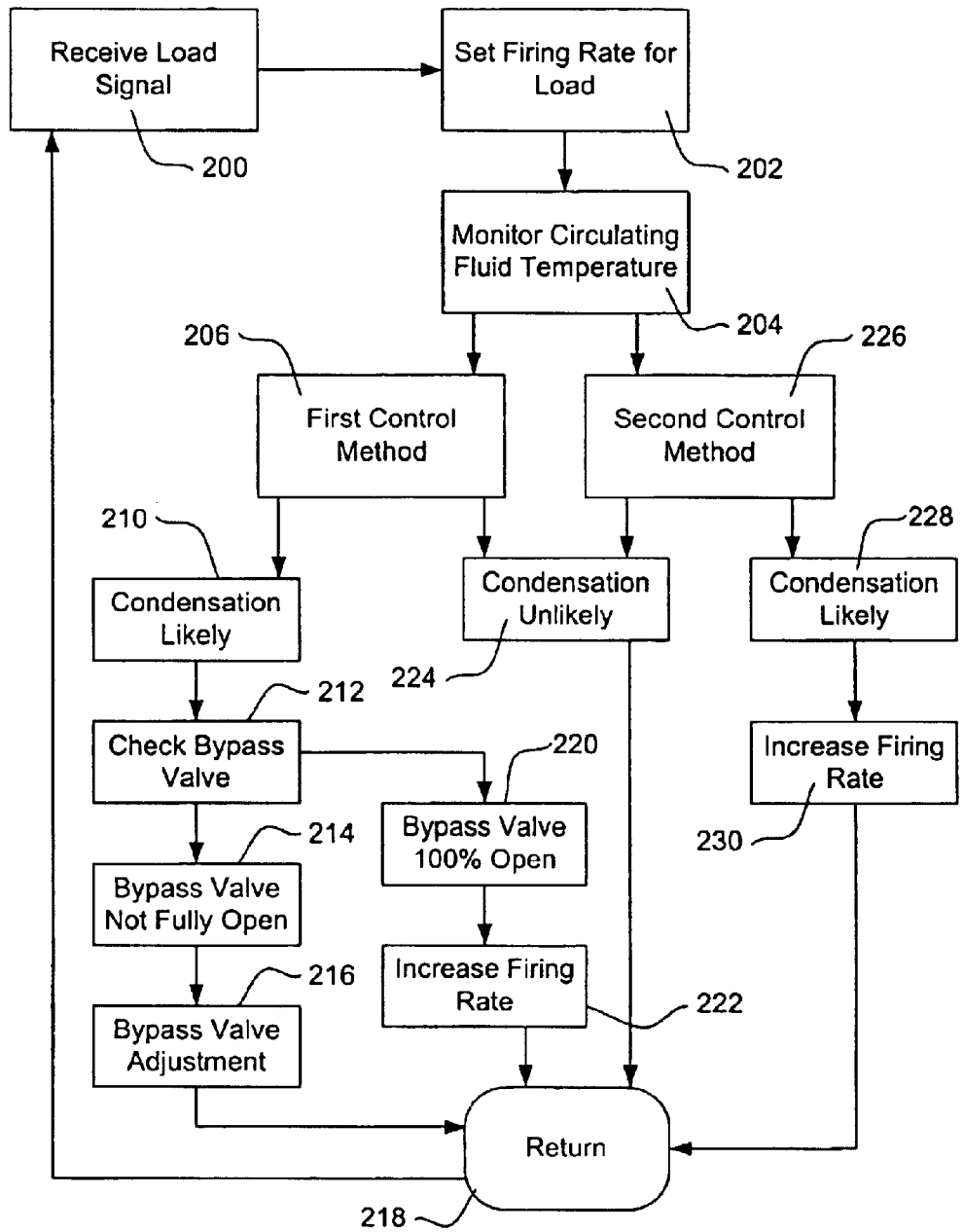
FIG. 4 is another block diagram for an illustrative method.

FIGS. 3 and 4 are block diagrams showing steps of two illustrative methods. FIG. 3 illustrates a method of controlling firing rate to meet a heat load and avoid condensation. A heat load signal is received, as shown at 100, and the firing rate is then set to provide a heat output for the boiler to meet the heat load, as shown at 102. Next, the risk of condensation is assessed, as shown at 104. If the risk is acceptable, as shown at 106, the method recycles back to wait to receive another heat load signal as shown at 100. If the risk is not acceptable, as shown at 108, the method continues to increase the firing rate to reduce the risk of condensation, as shown at 110. By increasing the firing rate as shown at 110, the method increases the heat output of the boiler to a level beyond that needed to meet the heat load in order to prevent condensation.

FIG. 4 illustrates another method for controlling condensation risk having two control sub-methods. Again, as shown at 200, the method begins by receiving a load signal, and setting the firing rate for the load, as shown at 202. Next, the circulating fluid temperature is monitored as shown at 204. The circulating fluid may be monitored at one or more locations, for example, for inlet, output, or bypass temperature.

The two control methods may operate in parallel, or may be incorporated to a controller that operates one method and then the other as callable subroutines in software, for example. A first control method starts at 206 with a determination of whether condensation is likely or unlikely. The determination may be, for example, a comparison of a measured temperature to a setpoint, or a comparison of a measured temperature and rate of change to some other value. If condensation is likely, as shown at 210, the method continues to check the bypass valve as shown at 212. If the bypass valve is not fully open, as shown at 214, the method continues with a bypass valve adjustment, as shown at 216. After adjustment of the bypass valve (e.g. opening the bypass valve), the method goes on to a return block as shown at 218, which goes back to wait for a next iteration.

Working backwards from the bypass valve adjustment shown at 216, if the check of the bypass valve 212 shows that the bypass valve is (or should be) fully open, as shown at 220, the method goes on to increase the firing rate, as shown at 222. Again, from the increase in firing rate at 222, the method goes on to the return block shown at 218. Going farther back, if the first control method determines that condensation is unlikely, as shown at 224, the method simply jumps to the return block shown at 218.

A second control method also operates, as shown at 226. If the second control method determines that condensation is unlikely as shown at 224, the second control method bypasses other steps and goes to the return block. If the second control method 228 determines that condensation is likely, as shown at 228, the second control method simply increases the firing rate, as shown at 230, and continues to the return block at 218.

It should be noted that the second control method does not wait for the bypass valve to be fully open. As such, the second control method is a "fast" method which goes directly to the step of increasing the firing rate. Meanwhile, the first control method 206 can be referred to herein as an "ordinary" control method since it takes a more deliberate approach and does not directly go to the step of increasing firing rate.

One of skill in the art will understand that the present invention may also be manifested in a controller for controlling a boiler, the controller adapted for performing the methods explained above. In one such embodiment, a controller (such as controller 28 in FIG. 1) includes a set of instructions stored on a readable medium for performing the above steps. The readable medium may be, for example, an electrically, magnetically, or optically readable medium. The controller may contain any number of logic circuits or components and may include a microcontroller or microcomputer.

While adding to the physical complexity of the system, an alternative (either separate or for use in conjunction with the above methods) is to include a second bypass valve adapted for quickly opening and closing in response to a stimulus. The purpose of the second bypass valve would be to provide an immediate, yet coarse, response for boiler protection, and would be an extraneous part the majority of the time. Therefore a cheap on/off valve would be used for a second bypass valve, the on/off valve lacking precise or accurate intermediate levels. For example, a valve having three settings: full on, half on, full off, could be used for a second bypass valve when bypass temperatures drop beyond a safe limit.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for controlling a boiler having a primary heat exchanger, the primary heat exchanger adapted to receive an incoming fluid stream, heat the incoming fluid steam, and provide an outgoing heated fluid steam to a heat load, the primary heat exchanger further having a minimum temperature threshold for the incoming fluid stream, the method comprising:
   controlling the heat output of the boiler to meet the heat load; and
   increasing the heat output of the boiler beyond what is required to meet the heat load and provide at least some of the heated water to the incoming fluid steam if the temperature of the incoming fluid steam would otherwise fall below the minimum temperature threshold of the primary heat exchanger.

2. A method for controlling a boiler having a primary heat exchanger, the primary heat exchanger adapted to receive an incoming fluid steam, heat the incoming fluid steam, and provide a heated output fluid stream to a heat load, the boiler further including a bypass flow path with a bypass valve for selectively providing some of the heated output fluid stream back to the incoming fluid stream, the primary heat exchanger further having a minimum temperature threshold for the incoming fluid, the method comprising:
   controlling the boiler to meet the heat load;
   controlling the bypass valve in an attempt to maintain the temperature of the incoming fluid stream above the minimum temperature threshold of the primary heat exchanger; and
   overriding the boiler controlling step and/or the bypass valve controlling step to increase the temperature of the incoming fluid stream if the boiler controlling step and/or the bypass valve controlling step cannot maintain the temperature of the incoming fluid stream above the minimum temperature threshold of the primary heat exchanger.

3. A method according to claim 2 wherein the overriding step is faster acting than the boiler controlling step.

4. A method according to claim 2 wherein the overriding step is faster acting than the bypass valve controlling step.

5. A method for controlling a boiler having a primary heat exchanger and a firing rate, the primary heat exchanger adapted to receive an incoming fluid steam, heat the incoming fluid steam, and provide a heated output fluid stream to a heat load, the firing rate normally being adjusted to meet the heat load, the boiler further including a bypass flow path with a bypass valve for selectively providing some of the heated output fluid stream back to the incoming fluid stream, the primary heat exchanger further having a minimum temperature threshold for the incoming fluid stream, the method comprising:
   detecting the temperature of the incoming fluid stream;
   controlling the bypass valve in an attempt to maintain the temperature of the incoming fluid stream above the minimum temperature threshold of the primary heat exchanger;
   controlling the firing rate to meet the heat load; and
   increasing the firing rate if the bypass valve controlling step cannot maintain the temperature of the incoming fluid stream above the minimum temperature threshold of the primary heat exchanger.

6. A method according to claim 5 wherein the firing rate control step is controlled at a first control rate, and the firing rate increasing step is controlled at a second control rate, wherein the second control rate is faster than the first control rate.

7. A method for controlling a boiler having a primary heat exchanger with a condensation temperature, and a bypass valve, the method comprising:
   monitoring a bypass temperature for circulating fluid entering the primary heat exchanger;
   operating a first control method for the bypass temperature wherein the first control method calls for an increase in bypass temperature by sending a valve signal to open or close the bypass valve;
   operating a second control method to determine whether an increase in bypass temperature is needed, wherein, if the second control method determines an increase in bypass temperature is needed, the second control method calls for an increase in firing rate regardless whether the bypass valve is 100% open.

8. The method of claim 7 wherein, for the first control method:
   the valve signal is accumulated;
   the accumulation of the valve signal can reach and exceed a 100% level where the bypass valve is fully open; and
   after the accumulation of the valve signal exceeds the 100% level, the first control method is adapted to call for an increase in boiler firing rate to increase bypass temperature.

9. The method of claim 8 wherein first control method is adapted to call for an increase in boiler firing rate after the valve signal exceeds the 100% level by a threshold amount.

10. The method of claim 8 wherein first control method is adapted to call for an increase in boiler firing rate when the valve signal exceeds the 100% level for a certain amount of time.

11. The method of claim 7 wherein, for the first control method:
    the valve signal is accumulated;
    the accumulation of the valve signal can reach and exceed a 100% level where the bypass valve is fully open; and
    when the accumulation of the valve signal exceeds the 100% level, the first control method calls for an increase in boiler firing rate to increase bypass temperature.

12. A controller for a boiler system having a memory containing an executable instruction set for performing the methods of claim 7.

13. A method of boiler control for a boiler having a circulating fluid inlet, a circulating fluid outlet, and a primary heat exchanger at which heat is added to the circulating fluid, the boiler being controlled at a firing rate, comprising:
    observing a fluid temperature for a circulating fluid used in association with the boiler; and,
    generating a first error signal for the purpose of limiting undesirably cool circulating fluid entering the primary heat exchanger;
    generating a second error signal for the purpose of limiting undesirably cool circulating fluid from entering the primary heat exchanger, the second generating step acting faster than the first generating step to changes in the temperature of the circulating fluid.

14. The method of claim 13 wherein the second error signal is only generated if an observation of the fluid temperature of the circulating fluid at a location fluidly prior to the primary heat exchanger determines that the fluid temperature is in a range indicating a likelihood of undesirably cool circulating fluid entering the primary heat exchanger.

15. The method of claim 13 wherein the boiler further includes a cold water bypass valve, the method further including observing the fluid temperature of the circulating fluid and generating a signal using the observed fluid temperature to control the coldwater bypass valve.

16. The method of claim 13 further comprising the step of determining whether the first error signal or the second error signal indicates a need to increase the boiler firing rate.

17. The method of claim 13 further comprising the step of selecting whichever of the first error signal or the second error signal indicates a greater need for an increase of the boiler firing rate.

18. The method of claim 17 wherein, if either the first error signal or the second error signal indicates a need to increase the boiler firing rate, the method further comprises increasing the boiler firing rate.

19. The method of claim 13 wherein the boiler is a high efficiency condensing boiler having a primary heat exchanger and a secondary heat exchanger, the secondary heat exchanger configured for exchanging heat from flue gasses produced in the primary heat exchanger with the circulating fluid.

20. The method of claim 19 wherein the step of measuring a fluid temperature for the circulating fluid includes measuring a bypass temperature defined as the circulating fluid temperature at the inlet to the primary heat exchanger, the method further comprising:

if the bypass temperature is below a defined threshold, measuring an inlet temperature of the circulating fluid at the inlet to the secondary heat exchanger, wherein the second error signal is generated using a proportional measurement of the inlet temperature and an integral measurement of the bypass temperature.

21. A controller for a boiler system having a memory containing an executable instruction set for performing the methods of claim 20.

22. A controller for a boiler system having a memory containing an executable instruction set for performing the methods of claim 13.

23. A method of controlling a high efficiency condensing boiler having an adjustable firing rate, a primary heat exchanger, and a secondary heat exchanger, the primary heat exchanger creating flue gasses used for heat exchange in the secondary heat exchanger to warm a circulating fluid passing through both the primary heat exchanger and the secondary heat exchanger before the fluid enters the primary heat exchanger, the method comprising:

observing a bypass temperature at a location fluidly adjacent the intake for the primary heat exchanger; and if the bypass temperature is above a predefined threshold, operating the system in accordance with a first proportional/integral control method reliant primarily upon measurements of the bypass temperature;

otherwise, operating the system in accordance with a safety method using:

the first proportional/integral control method to generate a first error signal for indicating whether the firing rate of the boiler should be increased to prevent condensation in the primary heat exchanger; and a second error generation method making use of signals both the measured bypass temperature and a measured inlet temperature taken from the circulating fluid at the intake to the secondary heat exchanger.

24. A controller for a boiler system having a memory containing an executable instruction set for performing the methods of claim 23.

25. A method of controlling a high efficiency condensing boiler having a primary heat exchanger and a secondary heat exchanger, the secondary heat exchanger configured for exchanging heat between flue gasses having a condensation temperature that are created by the boiler and a circulating fluid circulated in a predetermined direction by the boiler, the boiler configured to have a bypass sensor for sensing a bypass temperature of the circulating fluid at a location fluidly between the secondary and primary heat exchangers, and inlet sensor for sensing an inlet temperature of the circulating fluid at a location fluidly prior to the secondary heat exchanger; the method comprising:

observing whether the boiler bypass temperature is in a range where fast response to a change in cold water input may be needed; and, if so:

(a) observing the inlet temperature;

(b) comparing the inlet temperature to the condensation temperature to determine whether the inlet temperature indicates a likelihood of the circulating fluid entering the primary heat exchanger at an undesirably low temperature, and generating a first error value based on the current inlet temperature; and (c) observing the bypass temperature to generate an integral error that accumulates with time when the bypass temperature is more than an allowed amount below a predefined bypass setpoint value that is larger than the condensation temperature;

combining the first error value and the integral error to create an output value; and if the output value indicates a likelihood of the circulating fluid entering the primary heat exchanger at an undesirably low temperature, increasing a firing rate for the boiler.

26. A controller for a boiler system having a memory containing an executable instruction set for performing the methods of claim 25.

27. A boiler system comprising a high efficiency condensing boiler and a controller as defined in claim 26.

* * * * *